(No Model.) 2 Sheets—Sheet 1.
J. W. MILLER.
CORN HARVESTER.
No. 470,069. Patented Mar. 1, 1892.
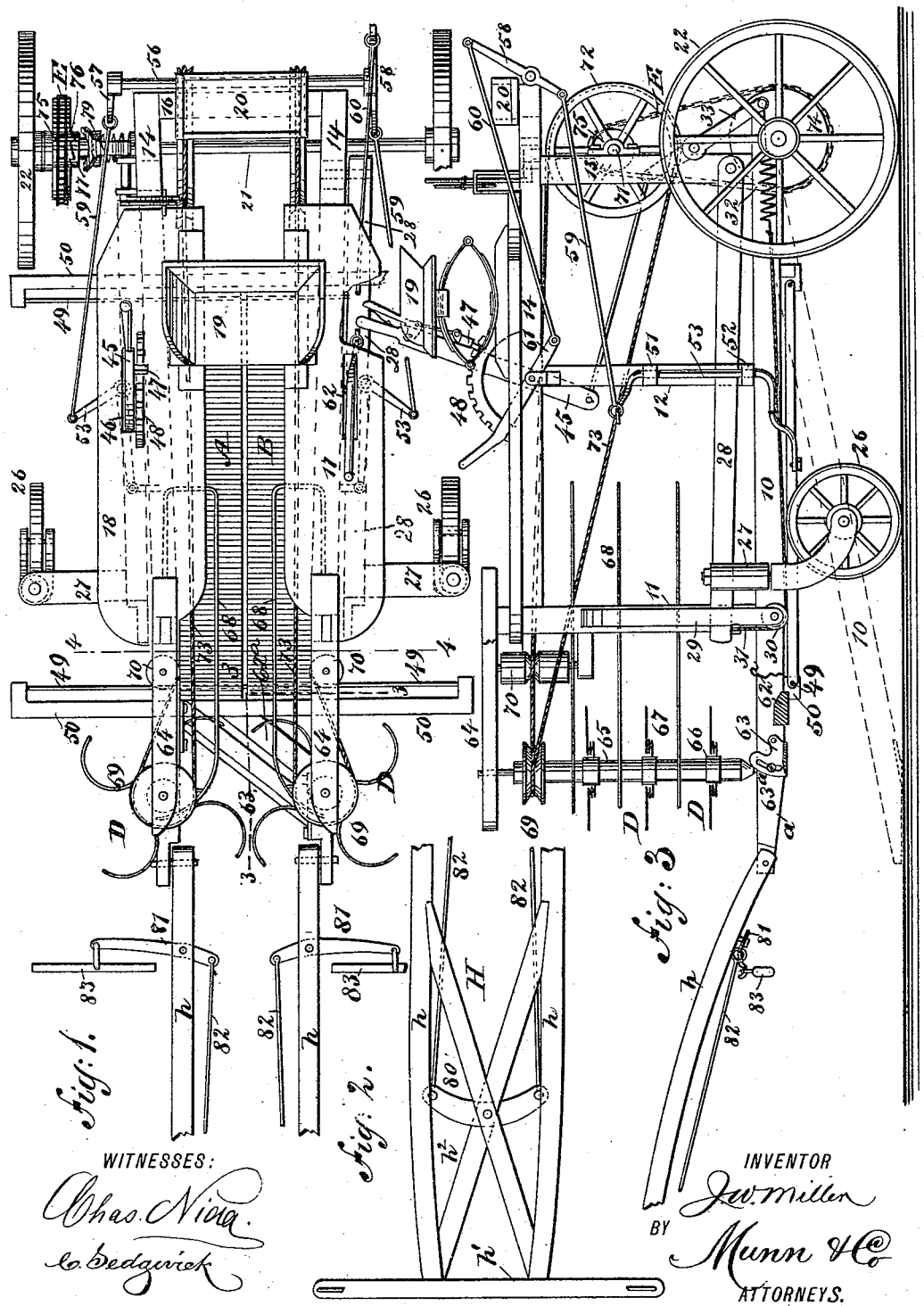
WITNESSES:
Chas. Niola
Co. Sedgwick
INVENTOR
J.W. Miller
BY
Munn & Co
ATTORNEYS.

(No Model.) 2 Sheets—Sheet 2.

J. W. MILLER.
CORN HARVESTER.

No. 470,069. Patented Mar. 1, 1892.

WITNESSES:
Chas. Nida
C. Sedgwick

INVENTOR
J. W. Miller
BY Munn & Co.
ATTORNEYS.

UNITED STATES PATENT OFFICE.

JAMES W. MILLER, OF STEWARTSDALE, NORTH DAKOTA, ASSIGNOR TO HIMSELF AND LUCIUS LAFAYETTE JOHNSON, OF SAME PLACE.

CORN-HARVESTER.

SPECIFICATION forming part of Letters Patent No. 470,069, dated March 1, 1892.

Application filed May 14, 1891. Serial No. 392,703. (No model.)

*To all whom it may concern:*

Be it known that I, JAMES WALTER MILLER, of Stewartsdale, in the county of Burleigh and State of North Dakota, have invented a new and Improved Corn-Harvester, of which the following is a full, clear, and exact description.

My invention relates to an improvement in corn-harvesters, and has for its object to provide a harvester of exceedingly simple, durable, and economic construction, and to so construct the harvester that that portion containing the drop mechanism and cutting blade or blades may be carried downward so as to cut close to the ground, or carried upward so as to cut the corn some distance from the ground.

Another object of the invention is to provide a cutting-knife capable of being adjusted to any desired angle or adjusted vertically, and to provide a means whereby the cut corn may be effectually guided to dumping-platforms, which platforms are capable of being operated by the driver of the harvester at will.

The invention consists in the novel construction and combination of the several parts, as will be hereinafter fully set forth, and pointed out in the claims.

Reference is to be had to the accompanying drawings, forming a part of this specification, in which similar figures and letters of reference indicate corresponding parts in all the views.

Figure 5:
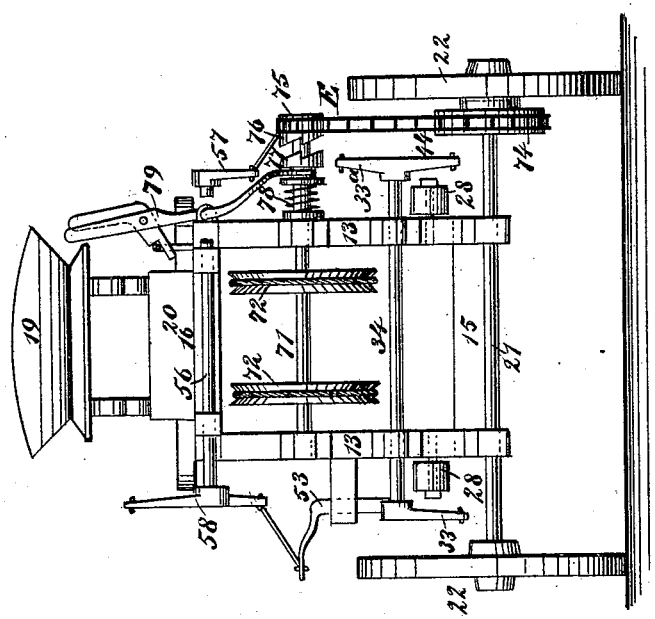
Figure 4:
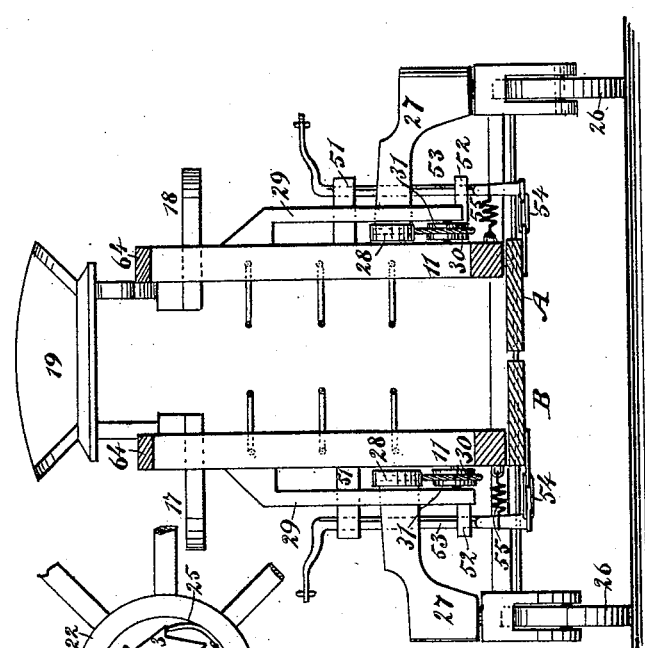
Figure 6:
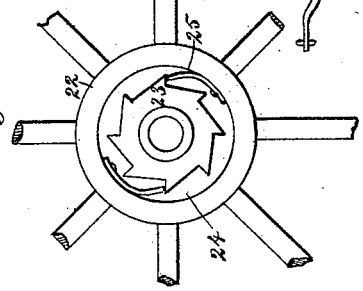

Figure 1 is a plan view of a harvester constructed in accordance with my invention. Fig. 2 is a plan view of the forward portion of the harvester-tongue. Fig. 3 is a side elevation of the harvester, the forward portion being in section, which section is taken practically on the line 3 3 of Fig. 1. Fig. 4 is a transverse vertical section taken on the line 4 4 of Fig. 1. Fig. 5 is a rear elevation of the harvester. Fig. 6 is a detail view of the driving-wheel hubs.

The frame of the machine consists, preferably, of two lower side sills 10, which are wider apart at their rear than at their forward ends, the under edge of said sills at their forward ends being inclined, as illustrated at $a$ in Fig. 3. Upon the sills preferably three uprights 11, 12, and 13 are erected, the forward uprights 11 being of greater height than the others, and the uprights 12 and 13 support top rails 14, which rails at their forward ends are mortised or otherwise secured in the upright 11. The lower sills 10 are connected at the back by a suitable cross-bar 15, and the upper rails or sills are connected in like manner by a bar or beam 16. The upper side rails are adapted to support platforms 17 and 18, spaced some distance apart, and upon the platforms the driver's seat 19 is usually located, the rear cross-bar 16 of the upper portion of the frame being adapted usually to support a tool-box 20. The frame is mounted at its rear end upon an axle 21, the said axle being free to turn in bearings secured to the lower sills of the frame, and upon the extremities of the axle driving-wheels 22 are loosely mounted, the said wheels being adapted, also, to support the machine. The wheels 22 turn the axle only when the machine is driven forward, at that time converting the axle into a drive-shaft, and this is accomplished by securing upon the axle ratchet-wheels 23, located within recesses 24, formed in the inner faces of the hubs, which ratchets are engaged by dogs 25, attached to the walls of the recesses, as is best shown in Fig. 6. When the implement is backed, it is evident that the dogs will slip over the ratchets and not act thereon.

The forward portion of the implement is supported by caster-wheels 26, located one at each side. These caster-wheels are not directly connected with the frame, but are pivoted in horizontal arms 27, which are attached to levers 28 and extend outward at a right angle therefrom, and the levers, one of which is located at each side of the frame, are pivoted at their rear ends to the rear standards or uprights 13 near the lower sills of the frame. The forward ends of the levers are held to slide in guideways 29, produced vertically upon the outer faces of the front uprights 11. In the lower ends of the slideways 29 friction-rollers 30 are journaled. A rope or chain 31 is attached to the forward free end of each lever, and said ropes are passed rearward over the friction-rollers 30, and are attached to springs 32 near the rear portion of the machine, which springs are in turn attached to crank-arms 33, formed upon the extremities of a rock-shaft 34, journaled transversely in suitable bearings at the rear of the machine, preferably a slight distance above the lower sills. A double-crank arm is formed upon the right-hand side of the rock-shaft 34, the upper member of which crank-arm is designated in the drawings as 33$^a$. This upper member of the crank-arm has a link connection with a lever 45, fulcrumed in an opening 46, produced in the right-hand platform 18, and the said lever 45 is provided with a spring-controlled thumb-latch 47, of the usual construction, adapted to engage with a suitable rack 48. By moving the lever 45 to the right or to the left it is evident that the body of the implement—that is, the entire frame—may be dropped downward a sufficient distance to cause the forward beveled edges of the lower sills to rest upon the ground, or practically so, as shown in dotted lines, Fig. 3, or the said frame or body may be elevated so as to be parallel with the ground, as shown in positive lines in the same figure, as when the lever 45 is carried over in direction of the front of the machine the crank-arms 44 are forced in the same direction and the cord or chain 31 is lengthened sufficiently to permit the body to drop at its forward end. When, however, the lever 45 is carried in the opposite direction, the crank-arms 44 are forced rearward and the cord or chain 31 is carried in the same direction, thus drawing the body or frame upward. The springs 32 are made to intervene the crank-arms 44 and the chains or ropes 31 in order to compensate for inequalities in the ground. The bottom of the frame is partially closed by two platforms or tables A and B. These platforms are adapted to have lateral movement and normally their inner edges are in engagement, or practically so, and the platforms are of sufficient length to extend some distance beyond each side of the center of the machine in direction of its ends, and when the platforms are close together they extend out beyond or essentially flush with the outer edges of the lower sills of the frame. The platforms or tables are supported through the medium of transverse tracks 49, located near the ends of the platforms, which tracks are supported by arms 50, projected outward from the sides of the frame, as illustrated in Fig. 1. The tracks pass through eyes or the equivalents thereof formed upon the ends of the platforms or tables. Brackets 51 and 52 are projected horizontally from the sides of the intermediate uprights 12, one bracket being located preferably at or near the center of the uprights and the other near the lower ends thereof, and in the brackets 51 and 52 angle-levers 53 are pivoted, which angle-levers each consist of a perpendicular body member and upper and lower horizontal members extending from the body member at right angles in opposite directions, the lower horizontal member of the levers being preferably curved downward, and said members are connected with the outer edges of the platforms or tables A and B by links 54 or the equivalent thereof, and are also connected with the lower sills of the frame by springs 55, of any suitable or approved form, which springs normally draw the lower members of the levers 53 inward, whereby the said members normally force the platforms or tables in engagement one with the other.

A rock-shaft 56 is journaled at the rear of the implement near the top thereof, provided at the right-hand side with a single-crank arm 57 and at the left-hand side with a double-crank arm 58. The single-crank arm and the lower member of the double-crank arm are connected by links 59 with the upper members of the levers 53, and the upper member of the left-hand double-crank arm is connected by a link 60 with a lever 61, fulcrumed upon the upper portion of the frame and extending upward through an opening 62 in the upper left-hand platform 17 within convenient reach of the driver's seat. By drawing the lever toward the seat the upper members of the side levers 53 are forced outward and the dumping-platforms A and B are carried in the same direction, whereby any material placed thereon will be dropped to the ground, and as soon as the lever 61 is released the springs 55 will return them to their normal or closed position.

In the forward portion of the lower sills of the frame a cross-bar 62$^a$ is diagonally located, and in front of the cross-bar a knife 63 is adjustably and diagonally secured, which knife is adapted to cut the corn. The knife is provided at each end with an upwardly-extending ear 63$^a$, which ears are pivoted to the lower sill and have vertical curved slots therein, and they are held at any desired angle with reference to a horizontal line by set-screws passing through the slots and into the sills, as is best shown in Fig. 3. Thus it will be observed that the knives may be elevated or they may be lowered to such an extent that when the body of the machine is lowered to the ground the knife will cut beneath the surface. Beams 64 are forwardly projected from the upper ends of the front uprights 11, which beams may be termed "guide-beams," as their inner faces are curved at their forward ends to direct the tops of the standing corn to the tables or platforms A and B; but the guidance of the corn to the knife and to the platform after having been cut is effected primarily and almost entirely through the medium of reels D. The reels D are horizontally located upon vertical shafts 65, journaled at their lower ends in the forward portions of the lower sills of the frame and at their upper ends in the guide-beams 64. Each of the reels consists, preferably, of a sleeve or collar 66, which is secured to the shaft upon which it is located by means of a set-screw or the equivalent thereof, and spring-arms 67, which radiate from the sleeve or collar, the said arms being horizontal and curved to form essentially a star-wheel. The shafts 65 are revolved so that the convexed surfaces of the spring-arms of the reels are made to turn inward.

Guide rails or bars 68 are located at the front portion of the implement, and usually consist of stout wires attached to the inner faces of the front uprights 11, the said wires being carried rearwardly from the uprights some distance, thence horizontally inward transversely of the implement, and thence horizontally and longitudinally in the direction of the front, the forward ends of the guide-bars being curved outward around the shafts 65. Thus the space through which the cut corn passes to reach the tables or platforms A and B is somewhat contracted, and the cut corn is thereby kept in compact shape. Each shaft 65 is provided at its upper end with a horizontal pulley 69, and back of each pulley a spool 70 is journaled. The spools and the pulleys are preferably grooved.

Between the upper and the lower rock-shafts 34 and 56 a driven shaft 71 is journaled at the back of the implement. Upon this driven shaft two driving-pulleys 72 are fixed, and the said driving-pulleys are connected by cross-belts 73 with the pulleys 69 upon the forward vertical shafts, one strand of a belt engaging with the grooved surface of a spool in front of the pulley, as is best shown in Fig. 3. The driven shaft receives motion from the axle or drive-shaft 21, and this is effected by securing upon the axle or drive-shaft a sprocket-wheel 74, and loosely mounting upon the driven shaft 71 a sprocket-pinion 75, provided with an inner clutch-face 76, and upon the shaft 71 a clutch 77 is held to slide, capable of turning with the shaft, and the shaft 71 is revolved when said clutch 77 is in engagement with the clutch-face 76 of the sprocket-pinion, it being kept normally in such engagement by a spring 78 back of the clutch, as shown in Fig. 5. When, however, it is desired to prevent the shaft 71 from revolving—as, for instance, in going to a field—the clutch 77 is disengaged from the pinion by means of a suitable lever 79, located, preferably, at the left of the machine and within convenient reach of the driver. The chain belt E connects the sprocket-wheel and pinion 74 and 75.

The tongue H is of peculiar construction and comprises two parallel side members $h$, the inner extremities whereof are pivotally attached to the frame of the implement. The side members are connected at their forward ends by a neck-yoke $h'$, and are braced at said ends by braces $h^2$, as shown in Fig. 2. The tongue H is provided with a draft-equalizer, constructed as follows: To the under faces of the braces a transverse curved bar 80 is centrally pivoted, and upon the under side of each side member near its rear end a bar 81 is also pivoted; but the latter bars have their fulcrum at one side of the center and extend outward beyond the side members of the tongue a much greater distance than inward, as is shown in Fig. 1. The inner ends of the rear bars 81 are connected with the extremities of the forward bar 80 by links 82, and the whiffletrees 83 are attached to the outer extremities of the rear bars, as is best shown in Fig. 1. Thus the draft is equalized to a great extent and the burden of the weight of the tongue is removed from the necks of the team by reason of the draft being applied to the tongue on its lower side, which tends to raise its forward end.

It will be understood that this machine is intended specially for harvesting corn grown in the Northwest and known as "Ree" or "squaw" corn, which has a stalk not over three feet high, and the ears of which project from the stalk at the ground-line or with their stems below the ground-line, and, therefore, the stalks will readily pass into the open tongue and back to the stationary cutting-knife. A stationary knife is required, as a rotary or reciprocating knife would soon become dull from contact with the earth. Where the ear-stems project from the stalk below the ground-line, the ears will of course be severed from the stalks and a solid dumping-platform must be used in order to prevent the ears from falling to the ground, as they would if dumping-fingers or an open-work dumper should be employed.

Having thus described my invention, I claim as new and desire to secure by Letters Patent—

1. A corn-harvester comprising a wheeled frame vertically adjustable at its forward end, a knife across said front end, a bifurcated tongue the rear ends of the members of which are pivoted to the front end of the frame in advance of the knife, horizontally-rotating reels on the frame at opposite ends of the knife, the oppositely-sliding longitudinally-extending platforms mounted on transverse guides behind the knife and abutting at their inner longitudinal edges, and mechanism for operating the said platforms, substantially as set forth.

2. The combination, with the frame having a wheeled axle at its rear end and a knife across its front open end, of two vertically-swinging side bars 28, pivoted at their rear ends to the rear end of the frame and provided at their front ends with outwardly-projecting arms, caster-wheels mounted on said arms beyond the sides of the frame to permit its front end to be lowered to the ground-line, a rock-shaft at the rear of the frame having arms, cables extending forwardly from the said arms around pulleys to the forward ends of bars 28, a lever mechanism connected with the said rock-shaft, laterally-dumping platforms on the frame in the rear of the knife, and means for operating them, substantially as set forth.

3. In a corn-harvester, the combination, with the frame having transverse parallel guides 49 49, and two longitudinally-extending platforms A B, sliding at their ends on said guides and meeting at their inner longitudinal edges, of the vertical crank-shafts, the lower cranks of which are connected with the outer edges of said platforms and provided with springs pressing the platforms inwardly, and a lever mechanism connected with the upper cranks of said shafts, substantially as set forth.

4. The combination, with the wheeled frame having a knife across its vertically-adjustable front end, of the pole formed of two bars $h\ h$, connected at their inner ends to the frame at the ends of the knife, a neck-bar $h'$, connecting the front ends of the bars $h\ h$, crossed braces $h^2$, the bar 80, pivoted centrally to the braces $h^2$, the draft-bars 81, pivoted to the rear ends of the bars $h$, and rods 82, connecting the ends of the bar 80 with the inner ends of the draft-bars 81, substantially as set forth.

5. In a corn-harvester, the combination, with the body thereof supported at its rear by an axle and wheels, and lift-levers fulcrumed at their rear ends at the rear of the body, one upon each side, the forward ends of which levers have movement in slideways formed upon the frame of the implement, of arms projected horizontally outward from the lift-levers near their rear ends, caster-wheels journaled in said ends, friction-pulleys journaled in the lower ends of the slideways of the frame, an adjusting-lever, cables attached to the free ends of the lift-levers and passed over the friction-pulleys, springs attached to the rear ends of the cables, a rock-shaft connected with said springs, and a link connection between the rock-shaft and the adjusting-lever, substantially as shown and described.

JAMES W. MILLER.

Witnesses:
JOHN F. FORT,
EDWD. S. ALLEN.